Patented Nov. 13, 1928.

1,691,424

UNITED STATES PATENT OFFICE.

EUGENE E. AYRES, JR., OF SWARTHMORE, AND ERLING H. HAABESTAD, OF PHILADELPHIA, PENNSYLVANIA, ASSIGNORS TO B. A. S. COMPANY, OF PHILADELPHIA, PENNSYLVANIA, A CORPORATION OF DELAWARE.

GEL AND PROCESS FOR PRODUCING THE SAME.

No Drawing.   Application filed October 21, 1924. Serial No. 745,006.

Our invention relates to gels and processes for producing the same, particularly with respect to gels produced from water soluble salts of organic acids.

Common sodium soaps are soluble or colloidally soluble in water and alcohol and a few other solvents but they are neither soluble nor colloidally soluble in such liquids as gasoline or benzol. Soaps are likewise not appreciably soluble in any organic halide that we have investigated, such as for example carbon tetrachloride, chloroform, butyl chloride, amyl chloride, the dichlorides of pentane, the chlorides of hexane, and some of the corresponding bromides and iodides, or in mercaptans and similar organic derivatives.

We have discovered that in spite of the insolubility of soaps in such organic derivatives it is possible to produce from liquid esters of inorganic acids and water soluble salts of substantially water-insoluble fatty acids, or such salts of derivatives of those acids as have the same colloidal characteristics as the salts of the acids themselves, colloidal gels of the same general character as gels formed from organic liquids and such water-insoluble soaps as aluminum stearate. We have found that colloidal gels may be formed by warming such organic derivatives together with certain water soluble salts of organic acids when the percentage of moisture present is limited, an example of such water soluble salt of organic acid being water soluble soaps and materials of similar colloidal characteristics. The temperatures to which the substances are heated is preferably near to but not above the boiling point, at the pressure at which it is being treated, of the organic derivative employed.

We have discovered that such gels are useful as a means for presenting a substance for chemical interaction with another substance, for example by making possible and preserving surface contact between the phases of the gel as more specifically described in our application Serial No. 705,007 filed October 21, 1924.

Gels formed in accordance with our invention from soluble salts of substantially water-insoluble fatty acids possess great stability and are usually not dispersable in or miscible with either an excess of the organic derivative or water although prolonged contact with a sufficient quantity of water will destroy the gel formation. Gels produced from water insoluble soaps, however, do not possess these properties. Gels produced in accordance with our invention from water soluble salts of substantially water-insoluble fatty acids are but slightly affected by strong aqueous solutions of salt or caustic soda and they maintain their gel formation when heated to high temperature under pressure. While we have not definitely ascertained a complete explanation of the phenomenon of the formation of gels in accordance with our invention, it occurs to us that it may be merely a production of a collodial condition or there may be a reaction between the water soluble salt of a substantially water-insoluble fatty acid and the organic derivative, e. g., liquid ester of an inorganic acid, that produces products, though perhaps only a trace thereof, that induce and stabilize the gel formation.

As will be apparent to those skilled in the art, in the light of our invention, the limiting conditions and proportions of ingredients essential to the preparation of gels in accordance with our invention are necessarily broad because of the extensive variations of the properties of water soluble salts of substantially water-insoluble fatty acids, such as water soluble soaps, and of such organic derivatives as will yield gels under variable physical conditions.

Common water soluble soaps are conspicuous examples of suitable water soluble salts of substantially water-insoluble fatty acids that have the property of forming stable collodial gels with organic derivatives in accordance with our invention. Other examples of water soluble salts of substantially water-insoluble fatty acids that will yield gels in accordance with our invention are the water-soluble salts of sulphonated fatty acids of high molecular weight.

From the foregoing it accordingly appears that in accordance with our invention gels may be produced from liquid esters of inorganic acids not only by the use of water-soluble salts of substantially water-insoluble fatty acids but also from water-soluble salts of such derivatives of such substantially water-insoluble fatty acids as have characteristics similar to the colloidal characteristics of the water-soluble salts of the acids themselves. Thus, as appears from the foregoing, water-soluble salts of the sulphonic derivatives of substantially water-insoluble fatty acids, like sulphonated oleic acid, lend themselves to the practice of our invention.

Examples of liquid esters of inorganic acids that may be used in the formation of gels in accordance with our invention are the chlorides, mercaptans and nitrates of hydrocarbons but we prefer in the practice of our invention to use liquid esters of inorganic acids that do not contain oxygen.

Halogen derivatives of hydrocarbons will readily form gels with water soluble salts of substantially water-insoluble fatty acids and we describe the formation of a gel from such substances in accordance with our invention for the purpose of assisting in the understanding of our invention, it being understood that our invention is not limited to the examples that are so described merely by way of illustration.

Examples of the process whereby the product of our invention can be produced are:

1. Stir with five grams of amyl chloride, five grams of powdered sodium oleate that contains about 5% moisture, warming the ingredients until near the boiling point at atmospheric pressure of amyl chloride. The soap powder swells up and the mass becomes a transparent gel that resembles physically a water solution of starch.

2. Warm a lump of commercial toilet soap weighing about 5 grams and containing about 20% of water with ten grams of chloroform for several hours at a temperature near to the boiling point at atmospheric pressure of the chloroform. In this case the gel is gradually produced.

While we have given specific examples of ingredients and conditions under which gels are produced in accordance with our invention we do not intend that our invention shall be limited to such details but that it shall be susceptible of such modifications and variations as fall within the hereunto appended claims. And in this connection it is pointed out that the limitation, above mentioned, upon the quantity of water present is merely that there must be sufficient water present to cause the gel formation to take place but it is not advantageous to have present so great a quantity of water that water will be excluded from the gel when it is formed.

It is to be understood that where reference is made in the claims to a water-soluble salt of a substantially water-insoluble fatty acid it is intended that such an expression will include also such water-soluble salts of those derivatives of such acids as have the same colloidal characteristics as the salts of the acids themselves, for example, water-soluble salts of the sulphonic derivatives of substantially water-insoluble fatty acids.

Chemical compounds having an organic basic radical and a radical or one or more atoms replaceable by organic radicals and capable of combination with a metal to form a stable organic salt, are liquid esters of inorganic acids within the spirit of this invention. Amyl chloride is an example of a liquid ester of an inorganic acid within the terms of this invention because it contains an organic basic radical and its chlorine is replaceable by, for example, the acid radical of oleic acid and is capable of combining with, for example, sodium to form a stable salt, the reaction of amyl chloride with sodium oleate producing amyl oleate and sodium chloride. The first heating of amyl chloride, with sodium oleate will form the colloidal gel of this invention, in which the contact between the amyl chloride and sodium oleate is of such nature that a reaction between them will be substantially quantitative and is produced without high temperatures and pressures and agitation and without substantial formation of undesirable compounds. Another example of a substantially water-insoluble liquid ester of an inorganic acid that forms a colloidal gel with a salt of a substantially water-insoluble fatty acid is ethyl nitrate which forms a gel with magnesium abietate, and the substances are thereby brought into such contact that they may be caused to react and produce ethyl abietate and magnesium nitrate. In view of the general principles and specific examples herein set forth the advantages of this invention may be obtained by those skilled in the art in the use or treatment of various substances, and another example is the formation of a gel by heating magnesium benzene sulphonate with ethyl nitrate to form a gel in which the substances are in such physical relation that they may be caused to react to produce ethyl benzene sulphonate and magnesium nitrate. Substances in which a halogen or sulphur atom is so combined as to be incapable of replacement by an organic acid radical are not liquid esters of an inorganic acid within the spirit of this invention.

What we claim and desire to secure by Letters Patent is:

1. A composition presenting substances for mutual reaction consisting of a substantially water-insoluble gel comprising a water-soluble salt of a substantially water-insoluble fatty acid and a liquid ester of an inorganic acid and water.

2. A composition presenting substances for mutual reaction consisting of a substantially water-insoluble gel comprising a water-soluble soap and a liquid ester of an inorganic acid and water.

3. A composition presenting substances for mutual reaction consisting of a gel comprising a water-soluble salt of a substantially water-insoluble fatty acid and a liquid halide derivative of a hydrocarbon and water.

4. The process of preparing a liquid halogen derivative of a hydrocarbon for reaction with another substance which comprises producing a colloidal gel by treatment of said derivative by said substance in the presence of water.

5. A composition presenting substances for mutual reaction consisting of a gel comprising a water soluble salt of an organic acid and a liquid halide derivative of a hydrocarbon and water.

6. A composition presenting substances for mutual reaction consisting of a gel comprising a water soluble soap and a liquid halide derivative of a hydrocarbon and water.

7. The process for preparing a water-soluble salt of a substantially water-insoluble fatty acid for reaction with a halide of a hydrocarbon, which comprises forming a gel by heating said substances together in presence of water.

8. The process for preparing a water soluble salt of an organic acid for reaction with a halide derivative of a hydrocarbon which comprises forming a gel by heating said substances together in the presence of water, at a temperature near to the boiling point of said halide derivative.

9. The process of preparing a halide derivative of pentane for reaction with an alkali salt of oleic acid which comprises producing a colloidal gel by heating said halide derivative together with said salt in the presence of water.

10. The process of preparing a liquid ester of an inorganic acid for reaction with a water-soluble salt of a substantially water-insoluble fatty acid which comprises forming a gel by heating said substances together in the presence of water.

11. A composition of matter in the form of a stable colloidal gel comprising common soap and a liquid chlorine derivative of a saturated aliphatic hydrocarbon having three to six carbon atoms and water.

12. A composition of matter in the form of a stable colloidal gel comprising common soap and amyl chloride and water.

13. The process for preparing common soap for reaction with a liquid halide derivative of a hydrocarbon which comprises forming a gel by heating said substances together in the presence of water at a temperature near to the boiling point, at the pressure under which the treatment occurs, of said derivative.

14. The process of producing a colloidal gel which comprises treating common soap with amyl chloride in the presence of water.

15. The process of preparing a monochloride of an aliphatic hydrocarbon having three to six carbon atoms for reaction with common soap which comprises producing a colloidal gel by heating said substances together in the presence of water.

16. The process of preparing amyl chloride for reaction with sodium oleate which comprises heating said substances together in the presence of water and thereby producing a colloidal gel comprising said substances.

17. A composition presenting substances for mutual reaction consisting of a gel comprising a monochloride of an aliphatic hydrocarbon having three to six carbon atoms and a water-soluble salt of a substantially water-insoluble fatty acid and water.

In testimony whereof, we have signed our names to this specification.

EUGENE E. AYRES, Jr.
ERLING H. HAABESTAD.

CERTIFICATE OF CORRECTION.

Patent No. 1,691,424.   Granted November 13, 1928, to

EUGENE E. AYRES JR., ET AL.

It is hereby certified that error appears in the printed specification of the above numbered patent requiring correction as follows: Page 2, after line 11, insert the following sentence "Within the spirit of our invention liquid esters of inorganic acids include such esters as are liquid under the conditions of the reaction, either by reason of their boiling points being above the temperature of reaction or by reason of the pressure under which the reaction occurs."; and that the said Letters Patent should be read with this correction therein that the same may conform to the record of the case in the Patent Office.

Signed and sealed this 12th day of February, A. D. 1929.

(Seal)

M. J. Moore,
Acting Commissioner of Patents.